(12) United States Patent
Smets et al.

(10) Patent No.: US 11,810,097 B2
(45) Date of Patent: Nov. 7, 2023

(54) SYSTEMS AND METHODS FOR USE IN ENABLING DEVICE-TO-DEVICE COMMUNICATION, BASED ON USER INTERACTIONS WITH THE DEVICES

(71) Applicant: MASTERCARD TECHNOLOGIES CANADA ULC, Vancouver (CA)

(72) Inventors: Patrik Smets, Nijlen (BE); Christopher Bailey, Langley (CA); Jean-Bernard Collet, Vedrin (BE); Kuan Hua Chen, London (GB)

(73) Assignee: MASTERCARD TECHNOLOGIES CANADA ULC, Vancouver (CA)

( * ) Notice: Subject to any disclaimer, the term of this patent is extended or adjusted under 35 U.S.C. 154(b) by 16 days.

(21) Appl. No.: 17/565,320

(22) Filed: Dec. 29, 2021

(65) Prior Publication Data
US 2022/0122054 A1 Apr. 21, 2022

Related U.S. Application Data

(63) Continuation of application No. 17/125,810, filed on Dec. 17, 2020, now Pat. No. 11,301,834.

(60) Provisional application No. 62/950,608, filed on Dec. 19, 2019.

(51) Int. Cl.
*G06Q 20/20* (2012.01)
*G06Q 20/32* (2012.01)
*G06Q 20/04* (2012.01)
*G06Q 20/40* (2012.01)

(52) U.S. Cl.
CPC ....... *G06Q 20/3224* (2013.01); *G06Q 20/047* (2020.05); *G06Q 20/202* (2013.01); *G06Q 20/40975* (2013.01)

(58) Field of Classification Search
None
See application file for complete search history.

(56) References Cited

U.S. PATENT DOCUMENTS

| 2015/0039462 | A1 | 2/2015 | Shastry et al. |
| 2015/0332223 | A1 | 11/2015 | Aaron et al. |
| 2019/0188678 | A1 | 6/2019 | Arthur et al. |
| 2021/0192490 | A1 | 6/2021 | Smets et al. |

*Primary Examiner* — Joseph W. King
(74) *Attorney, Agent, or Firm* — Harness, Dickey & Pierce, P.L.C.

(57) ABSTRACT

Systems and methods are provided for extending dialogue between a mobile device and a point-of-interaction (POI). One example computer-implemented method includes receiving, by a conduit server, from the POI, via a first connection between the conduit server and the POI, a request for an extended connection between the POI and the mobile device, and notifying a host server of the request. The method then includes receiving, from the mobile device, via a second connection between the conduit server and the mobile device, an identifier for the mobile device and pairing, based on the identifier, the first and second connections, to establish a wireless connection between the POI and the mobile device, via the conduit server. The method further includes submitting a wake-up call to the mobile device, whereby the mobile device publishes the identifier to establish a wireless connection directly between the POI and the mobile device.

10 Claims, 11 Drawing Sheets

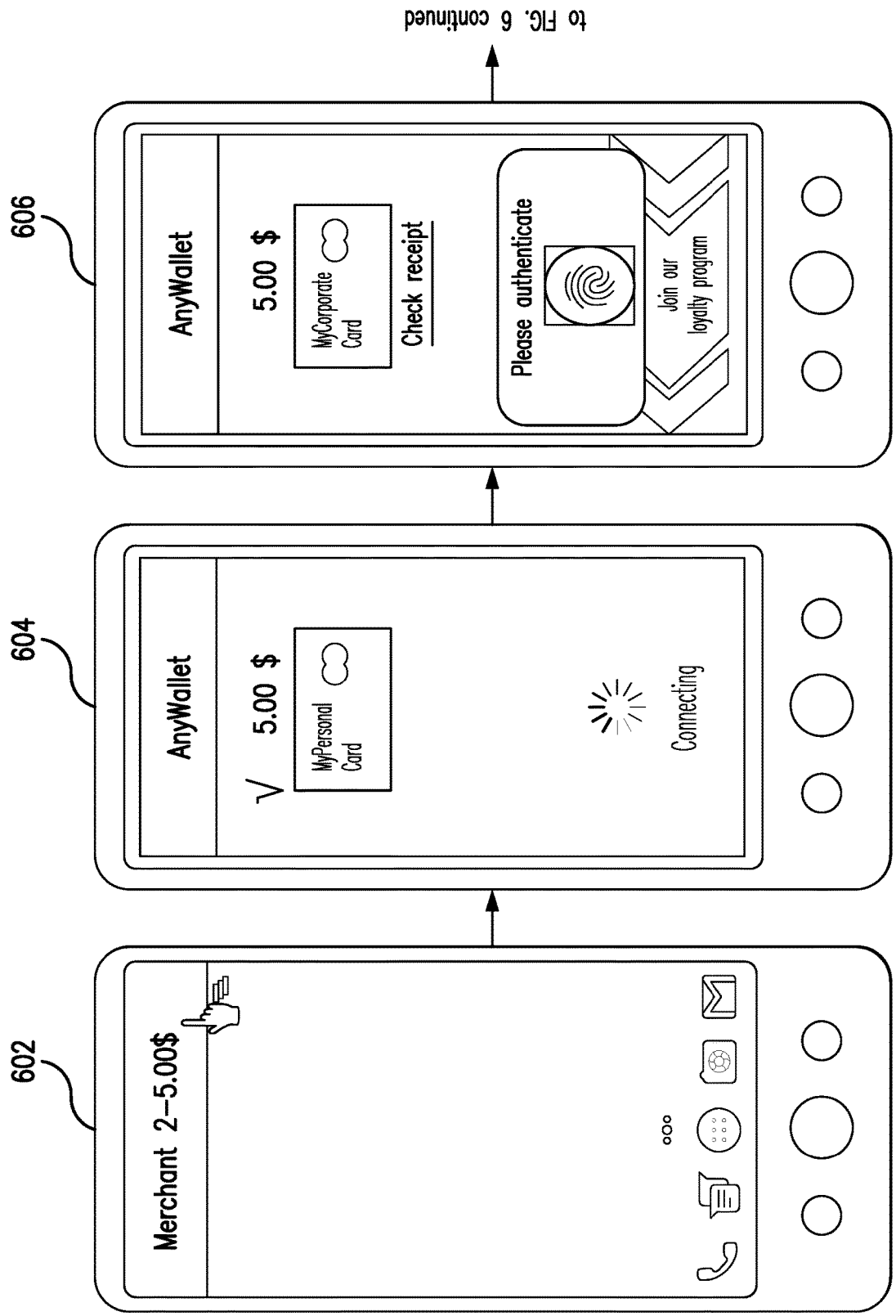

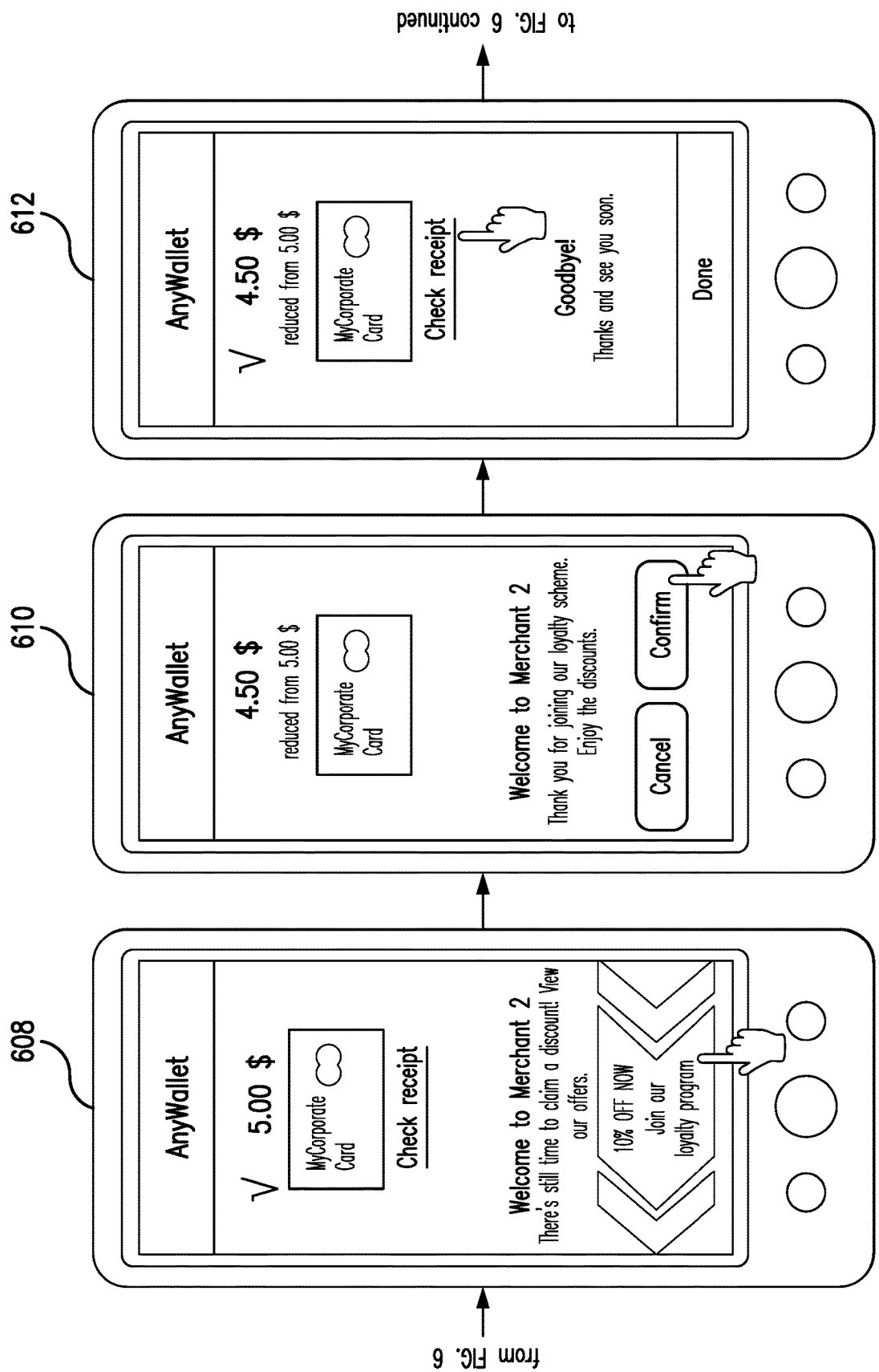

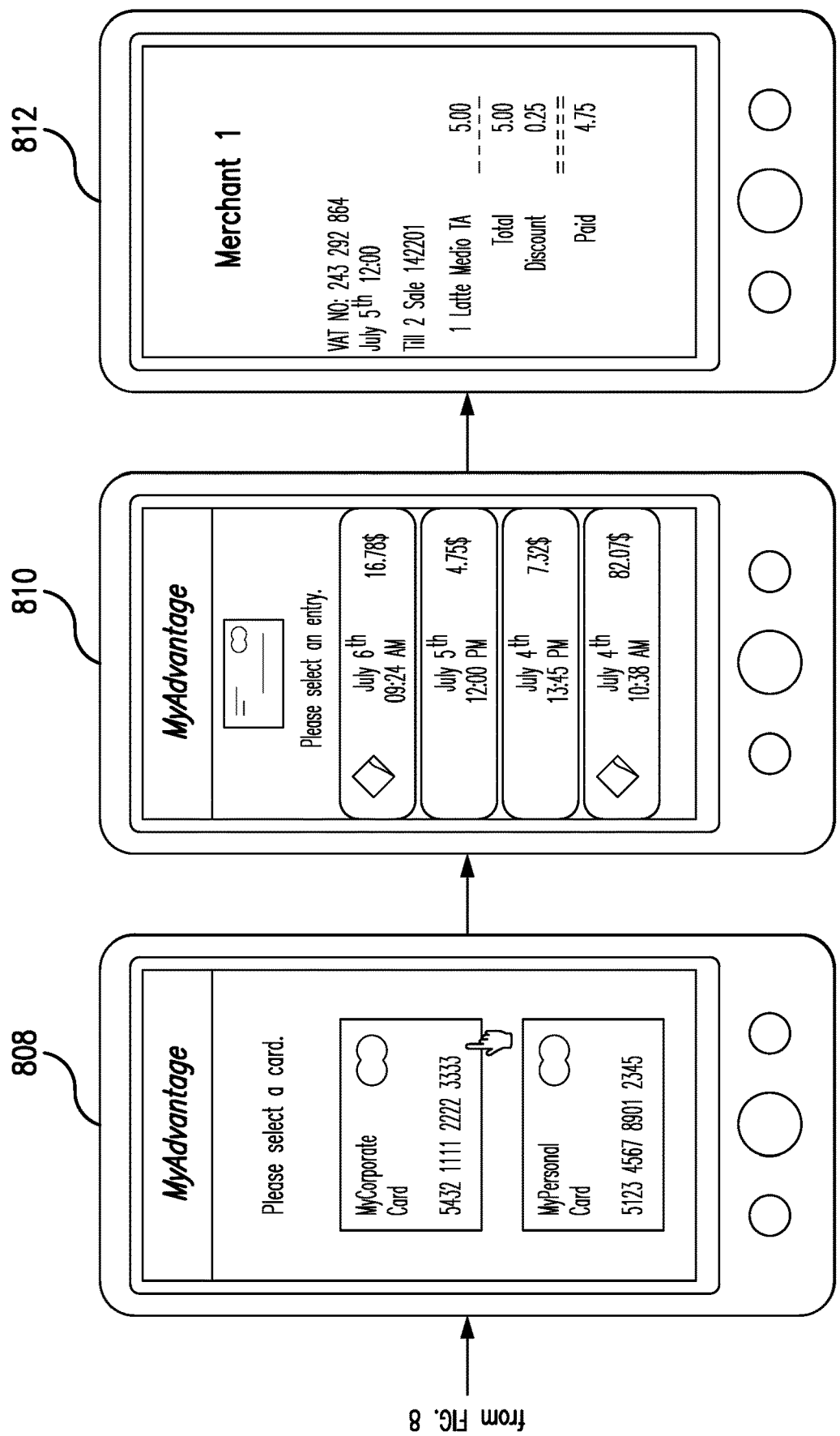

SYSTEMS AND METHODS FOR USE IN ENABLING DEVICE-TO-DEVICE COMMUNICATION, BASED ON USER INTERACTIONS WITH THE DEVICES

CROSS-REFERENCE TO RELATED APPLICATIONS

This application is a continuation of U.S. patent application Ser. No. 17/125,810 filed Dec. 17, 2020, which claims the benefit of, and priority to, U.S. Provisional Application No. 62/950,608 filed on Dec. 19, 2019. The entire disclosure of the above applications are incorporated herein by reference.

FIELD

The present disclosure is generally directed to systems and methods for use in enabling devices to communicate with each other, and in particular, to extending dialogue between a mobile device associated with a user and another device after an exchange between the user and the device.

BACKGROUND

This section provides background information related to the present disclosure which is not necessarily prior art.

Payment account transactions are common mechanisms for funding purchases of products (e.g., goods, services, etc.). For example, when a user desires to purchase a product from a merchant, the user may present a debit or credit card to the merchant in order to initiate a payment account transaction for the product. In so doing, the user may swipe the card at a magnetic stripe reader at a point-of-interaction at the merchant, or the user may tap the card at a near-field-communication (NFC) enabled point-of-interaction, whereby payment account credentials for the user's credit card are passed from the card to the given point-of-interaction.

In response, the point-of-interaction compiles and transmits an authorization request for the payment account transaction to an acquirer associated with the merchant. The authorization request includes the credentials received from the credit card and details of the transaction (e.g., an amount, a merchant ID for the merchant, a terminal ID for the point-of-interaction, a merchant category code (MCC) for the merchant, etc.). The authorization request is then passed from the acquirer to an issuer of the user's credit card, via a payment network (e.g., Mastercard™, VISA™, etc.), whereupon the issuer may decide to approve or decline authorization of the transaction. In either case, the issuer compiles and transmits an authorization reply back to the point-of-interaction, via the payment network and the acquirer. The authorization reply then permits the merchant to continue in the transaction if approved by the issuer, or halt the transaction if declined. For approved transactions, funds are later cleared and settled among the acquirer and the issuer, via the payment network.

It should be appreciated that beyond credit and debit cards, smartphone devices and wearable devices may also be used to initiate payment account transactions. In connection therewith, such devices are known to include wallet applications, with cards provisioned into them, which permit the devices to be tapped on point-of-interactions in order to provide payment account credentials to the point-of-interaction to initiate the transactions.

DRAWINGS

The drawings described herein are for illustrative purposes only of selected embodiments and not all possible implementations, and are not intended to limit the scope of the present disclosure.

Figure 1:
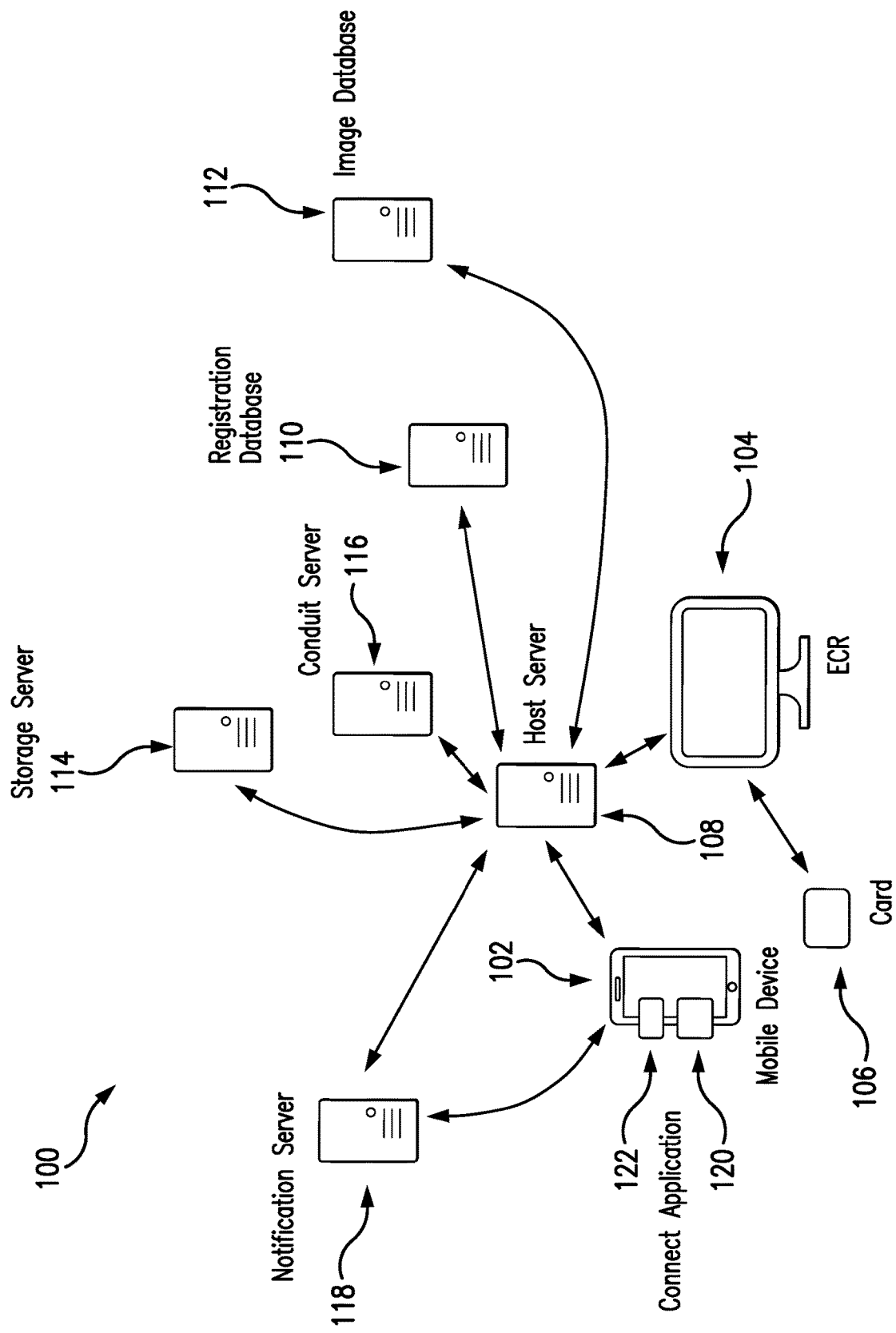
FIG. 1 illustrates an exemplary system of the present disclosure suitable for use in extending dialogues between mobile devices of users and points-of-interactions (POIs) in connection with interactions between the users and the POIs.
Figure 5:
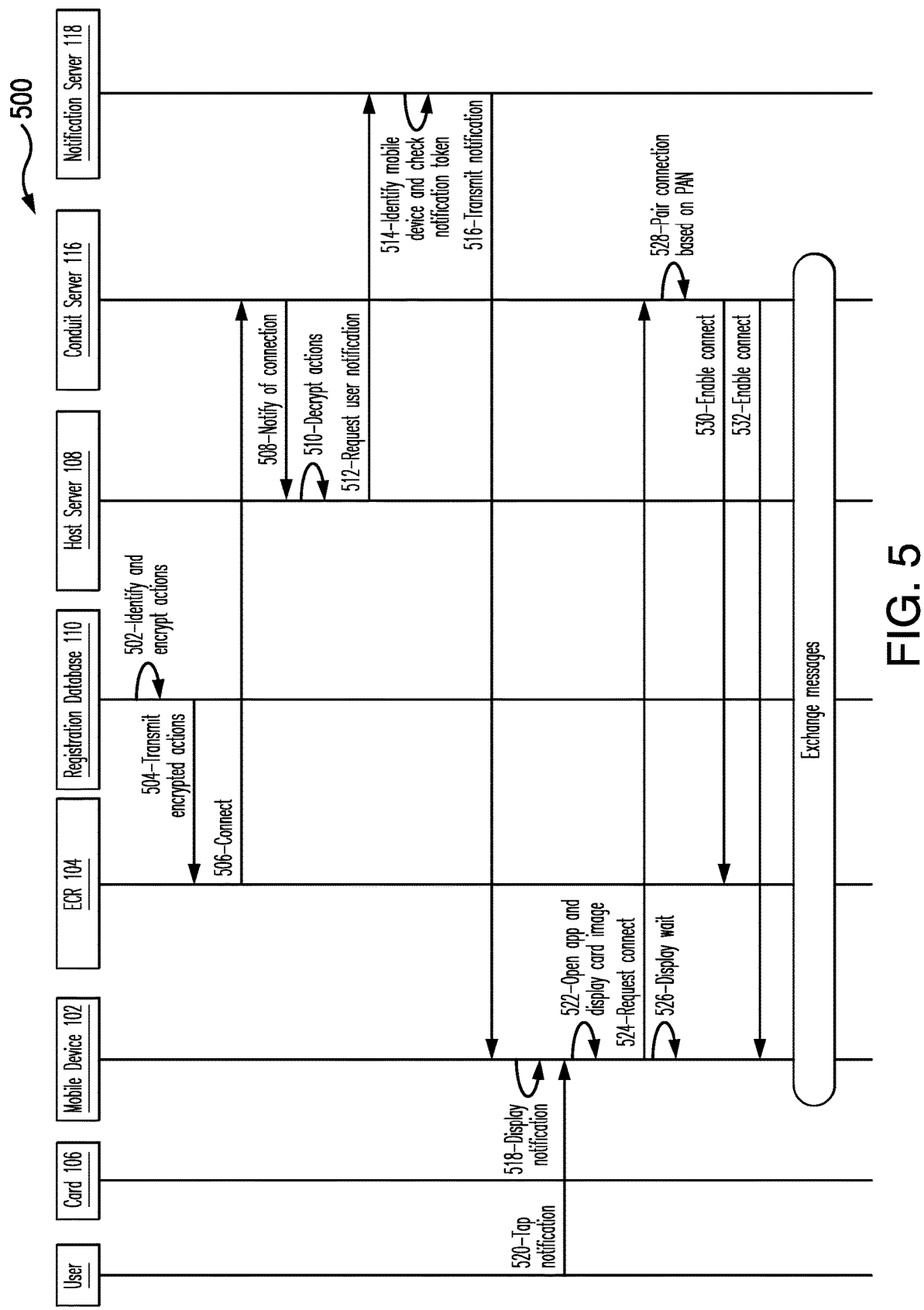
Figure 6:
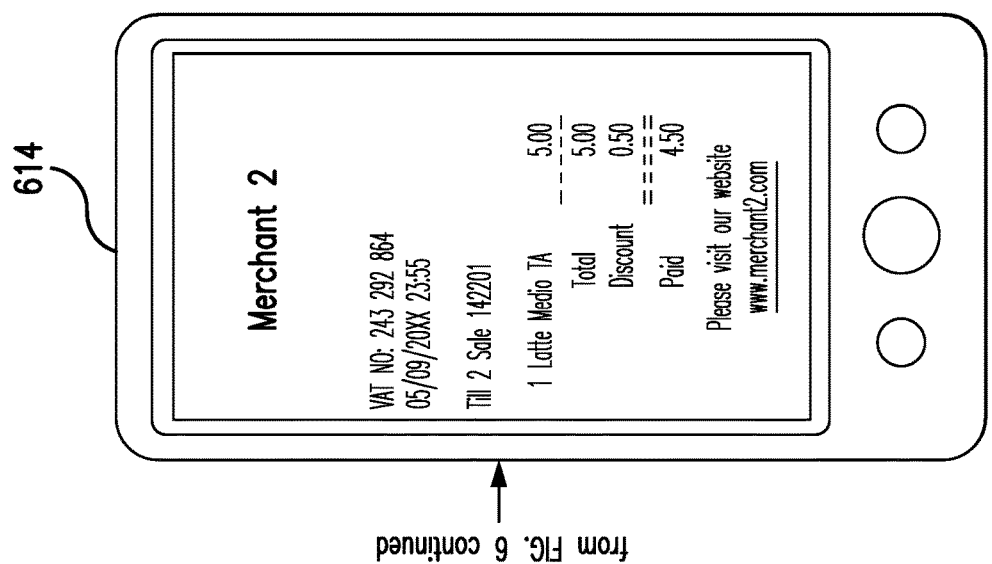
Figure 7:
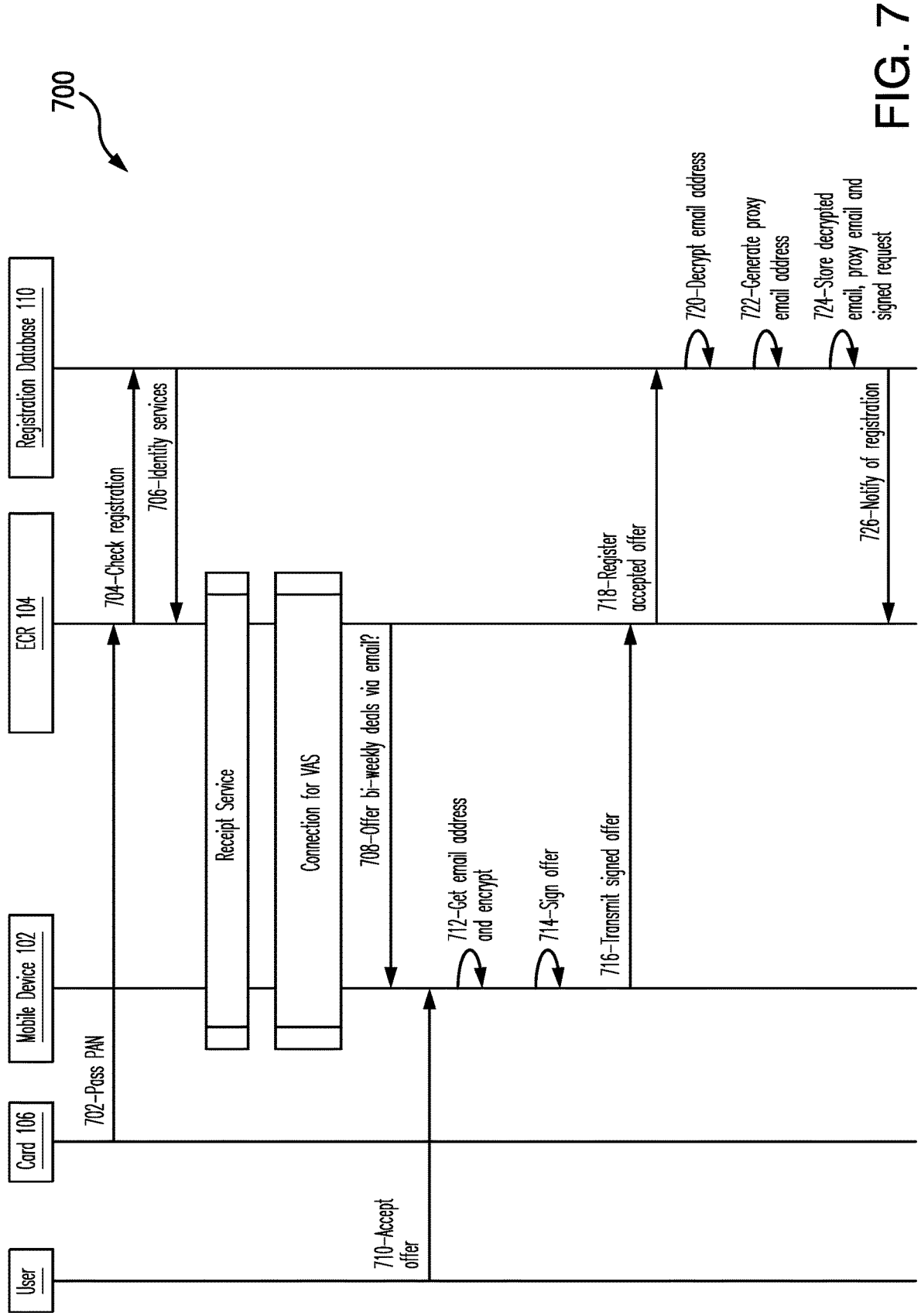
Figure 8:
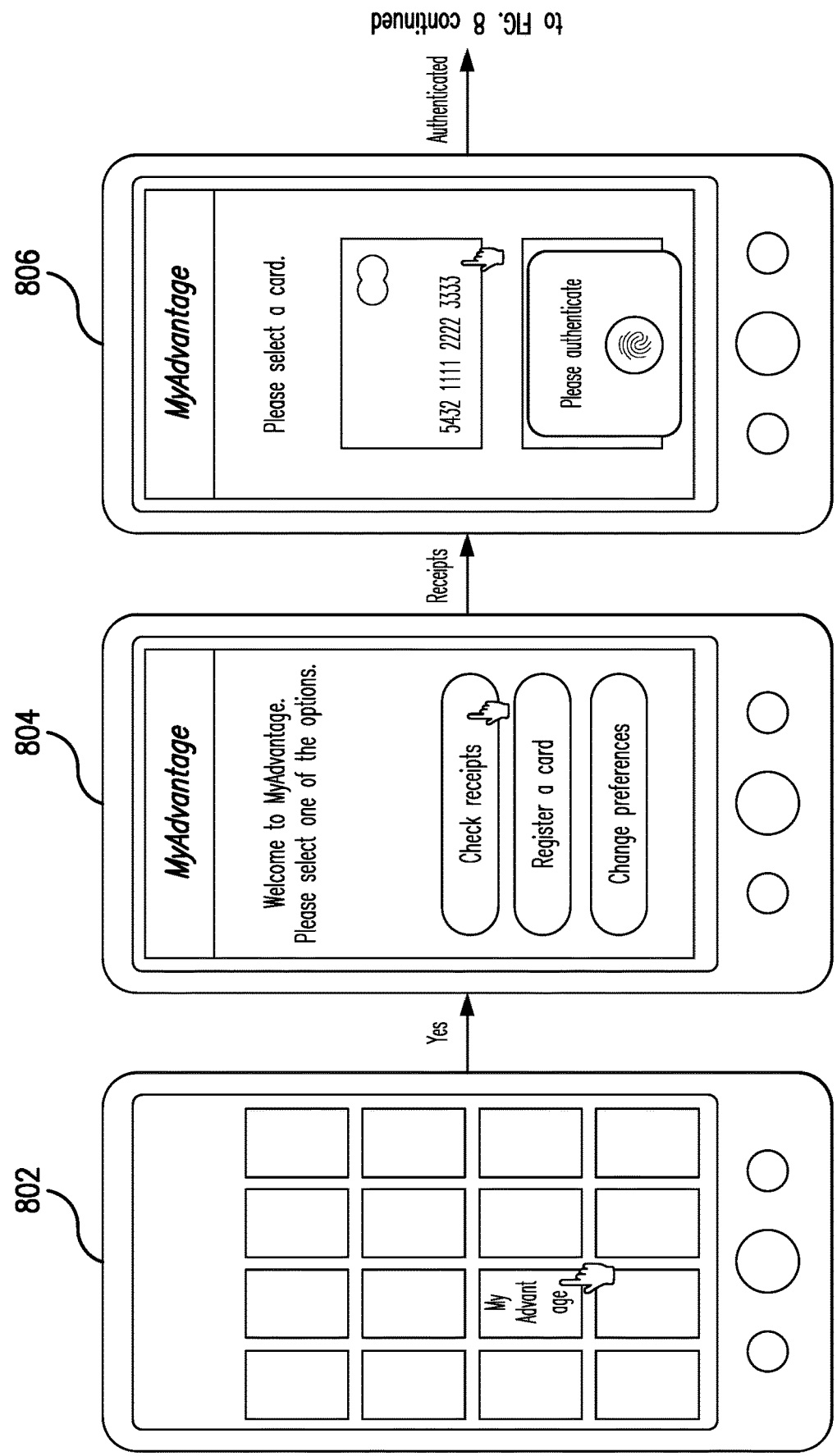

FIG. 5 illustrates another exemplary method, which may be implemented in connection with the system of FIG. 1, for extending a dialogue between a mobile device and a POI in connection with one or more value-added services; and FIG. 6 illustrates an exemplary series of interfaces that may be displayed to a user in connection with extending a dialogue between a mobile device and a POI in the system of FIG. 1 and/or the method of FIG. 5;

FIG. 7 illustrates another exemplary method, which may be implemented in connection with the system of FIG. 1, for extending a dialogue between a mobile device and a POI in connection with registering the user for services and/or actions; and FIG. 8 illustrates another exemplary series of interfaces that may be displayed to a user in connection with extending a dialogue between a mobile device and a POI in the system of FIG. 1.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

When a user initiates a card transaction at a merchant for payment for a product (e.g., a good or service, etc.), the user "taps", "dips," or "swipes" a payment card (e.g., a credit card, or debit card, etc.) at a point-of-interaction (POI) at the merchant (e.g., by bringing the card within a few or several centimeters of the POI, by inserting the card into a card reader of the POI, or sliding it through magnetic stripe reader of the POI, etc.). The card, in turn, transfers a credential(s) associated with an account linked to the card (e.g., a primary account number (PAN), etc.), via, for example, near-filed communication (NFC) (or contactless interaction), ISO 7816-3 (broadly, contact interaction), or ISO 7813 (broadly, magstripe interaction), to the POI, thereby permitting the POI to initiate the transaction. In general, the interaction between the card and the POI is concluded by (or upon) the passing of the credential, whereby any additional dialogue with the user is limited to the POI or an employee-user associated with the merchant or POI. In connection therewith, such additional dialogue between the user and the POI may be advantageous to present additional data and/or services to the user. The additional data and/or services may include, for example, data identifying the product(s) to be purchased, images of the product(s) scanned at the POI, loyalty accounts (or offers for loyalty accounts), coupons and voucher codes for the product(s) and/or other products, prices of the product(s), discounts for the product(s) and/or other products, quantities of product(s) purchased, payment tokens for the product(s) or others, receipt information, advertising, etc.

Uniquely, the systems and methods herein permit for, and enable, extending a dialogue (broadly, a communication) between a user and a POI at a merchant, in connection with a card presentment by the user at the POI, whereby further data may be exchanged therebetween. In particular herein, communication between the POI and the user is extended via a mobile device associated with the user, whereby additional data and/or services may be provided to the user. In this manner, technical aspects of the underlying interactions between the user and the merchant may be leveraged to layer on additional communication between the merchant and the user, through an alternate connection(s) via the user's mobile device, to thereby extend the user's experience with the merchant and provide additional services and/or capabilities not available to the underlying interactions.

FIG. 1 illustrates an exemplary system 100 in which one or more aspects of the present disclosure may be implemented. Although the system 100 is presented in one arrangement, other embodiments may include the parts of the system 100 (or other parts) arranged otherwise depending on, for example, types of interactions supported, payment devices used in such interactions, privacy concerns and/or requirements, etc.

The illustrated system 100 generally includes a mobile device 102, an electronic cash register (ECR) 104 (broadly, a POI), a card 106 (e.g., a payment card, another card, etc.), a host server 108, a registration database 110, an image database 112, a storage server 114, a conduit server 116, and a notification server 118, each coupled to one another (and in communication with one another) via various network connections. The network connections are generally represented in FIG. 1 by the arrowed lines and may each include wired or wireless connections, etc. That said, the system 100 may employ different wireless technologies to effect such communication (for wireless connections), such as Wi-Fi™ networks, Bluetooth Light (BLE)™, mobile data networks or the like, and/or may provide such communication through one or more local area networks (LANs), wide area networks (WANs) (e.g., the Internet, etc.), mobile networks, etc. The specific communication schemes, platforms, standards, etc. employed between the different parts of the exemplary system 100 are described in more detail below.

The mobile device 102 (broadly, communication device) in the system 100 is illustrated as a smart phone, and is associated with a user. In connection therewith, the mobile device 102 is configured to permit the user to view messages or communications at the device 102 and to provide responses to the messages or communications, as desired. It should be appreciated, though, that the mobile device 102 may include a different communication device in other embodiments, which is generally portable with the user, or not, depending on the particular embodiment. For example, the mobile device 102 may instead include a tablet or a wearable device (e.g., a smart watch, etc.), whereby the mobile device is still configured in a manner to permit the user to view messages or communications and to provide responses to the messages or communications.

The mobile device 102 also includes a connect application 120, which includes computer-executable instructions that configure the mobile device 102 to perform the different functions described herein (e.g., communication with the ECR 104, etc.). The connect application 120 may be specific and/or configured for different operating systems, such as, for example, iOS™ or Android™ operating systems, etc. The connect application 120 configures the mobile device 102 to establish a secure wireless connection with a point-of-interaction (POI) (e.g., the ECR 104, etc.), in connection with an interaction (e.g., a payment account transaction, etc.), which may be immediate and limited in time, or hours, days or even weeks or months after the interaction, as described in more detail below.

It should also be appreciated that, in some embodiments, the connect application 120 may be separate from, yet co-exist with or be coextensive with, an electronic wallet, or e-wallet, or, generally, a payment application 122 such as, for example, PayPass™ from Mastercard™, ApplePay™ from Apple, PayWave™ from Visa, GooglePay™ by Google, etc., installed at the mobile device 102 (e.g., in some embodiments the connect application 120 and the payment application 122 may be the same application, etc.) and perform as described herein, without modification to the payment application. What's more, it should be appreciated that the payment application 122 may be omitted from the mobile device 102 in other system embodiments. In at least one embodiment, the connect application 120 includes instructions consistent with the payment application 122 whereby the connect application 120 may configure the mobile device 102 to submit payment account credentials to the ECR 104 (e.g., in lieu of the payment application 122, etc.).

The ECR 104 in the system is a POI device associated with and/or included at a merchant (e.g., at an entity offering products (e.g., goods, services, etc.) for sale, etc.), at which a value-added service (VAS) request or a purchase transaction may be initiated. That said, the ECR 104 may be disposed at other entities and/or other locations and also interact with the user for reasons related to payment account transactions, or not. For example, the ECR 104 may be associated with a bank, whereby the interaction may be simply checking a balance of a payment account, etc. Regardless, the ECR 104 includes multiple input interfaces and/or multiple network interface devices which configure the ECR 104 to communicate in several manners. Initially, for example, the ECR 104 may include a card reader, which may be a contact card reader input device or contactless card reader input device into which and/or with which the card 106 may be dipped and/or tapped, and/or a magstripe reader input device through which the card 106 may be swiped. Further, the ECR 104 is configured to communicate, via a network interface device, with a card (e.g., via a dip, a tap, or a swipe, etc.), such as, for example, the card 106. In connection therewith, the ECR 104 is configured as a radio frequency identification (RFID) reader and/or a near field communication (NFC) interface, whereby the ECR 104 is configured for radio frequency and/or near field communication with the card 106, or other devices, for example, within a few centimeters of the ECR 104. The ECR 104 is further configured with a reader to read the card 106 when it is swiped, dipped, or tapped at the ECR 104. Further, in another manner, and like the mobile device 102, the ECR 104 is also configured to communicate, via a network interface device, through a local wireless network, such as, for example, one based on Wi-Fi™ and/or Bluetooth™ Low Energy technologies, whereby the ECR 104 may also communicate with the mobile device 102 at distances greater than a few centimeters.

That said, in one example embodiment, the card 106 may include a payment card 106 associated with a payment account issued to the user. In connection therewith, in this example, the card 106 includes a radio frequency (RF) chip, which is configured to emit radio waves, via an antenna associated therewith and included in the card 106, to a contactless reader such as included in the ECR 104. The RF chip may be active or passive, and the radio waves emitted from the card 106 may be indicative of information being passed, from the card 106, to the ECR 104 (and, in particular, to the contactless reader). In this exemplary embodiment, then, the card 106 is configured to pass information that includes a payment account credential for the payment account of the user (e.g., a primary account number (PAN), etc.) to the ECR 104, for example, in connection with a desired payment account transaction by the user at the merchant associated with the ECR 104, via contactless communication. Additionally, the card 106 may include one or both of a magstripe and an EMV chip (but not the RF chip), whereby the card may also (or alternatively) be configured to pass information that includes a payment account credential for the payment account of the user (e.g., the PAN, etc.) to the ECR 104 via corresponding contact-based communication/interaction (e.g., via a dip, a swipe, etc.). Additionally, the card 106 may also include other means of communicating with the ECR 104, whereby the card 106 may also (or alternatively) be configured to pass data that includes another type of information equally usable to recognize the user (e.g., a loyalty identifier, a national ID, a social security number, a mobile number, an email address, etc.) to the ECR 104 via a corresponding communication/interaction (e.g., via a QR Code, via manual key entry, etc.).

With continued reference to FIG. 1, the host server 108 is associated with the connect application 120, as is the registration database 110, the image database 112, the storage server 114, the conduit server 116 (which may be associated with the connect application 120 (and the host server 108), as described below, or not), and the notification server 118. The different servers and databases may be included in any different entities associated with the connect application 120. For example, the storage server 114 may be included at an issuer of the payment account linked to the card 106. And, the host server 108 and the registration database 110 may be included with a payment network (e.g., Mastercard International Incorporated, etc.), while the notification server 118 may be included with or as part of a notification service (e.g., Firebase™ notification service by Google, etc.), etc. In other system embodiment, the servers and/or database, and specifically, the configurations described below for each, may be distributed differently within the scope of the present disclosure. For example, the registration database 110 and the image database 112 may be included in one computing device with the storage server 114, or not. Likewise, the notification server 118 may be included in the conduit server 116, or vice versa.

With that said, the system 100 is described below with reference to use of the connect application 120 by a user in connection with the card 106.

In connection with registration for features of the present disclosure, initially, the user downloads and installs the connect application 120 into the mobile device 102. The mobile device 102, as configured by the connect application 120, in turn, registers with the notification server 118. In response, the notification server 118 is configured to generate a notification token, that is specific to the connect application 120 in the mobile device 102 (e.g., as identified by an application ID for the connect application 120, a phone number for the mobile device 102, etc.), and to transmit the notification token to the mobile device 102. Upon reception, the mobile device 102, as configured by the connect application 120, transmits the notification token to the host server 108. The notification token may be accompanied by identifying information for the connect application 120 and/or the mobile device 102 and/or the user (e.g., an application ID, a phone number, a name, an address, etc.). In response, the host server 108 is configured to append a profile to the registration database 110 for the user. The profile includes all, or at least a portion, of the identifying information and also the notification token.

Once installed, the user is permitted to add cards (e.g., payment cards, other cards, etc.) and/or accounts (e.g., payment accounts, etc.) and/or other identifiers (such as the aforementioned loyalty identifier, national ID, social security number, mobile number, email address, vehicle identification number, license number(s), etc.) to the connect application 120 (whereby the cards, accounts, identifiers, etc. may be associated with and/or linked to the user; etc.). In connection with adding the card 106, the mobile device 102, as configured by the connect application 120, may solicit details of the card 106, such as, for example, the PAN, an expiration date, a name of the user as it appears on the card 106, etc. (e.g., when the card 106 is a payment card, etc.).

In response, the user provides the solicited information. This may include the user entering the information (e.g., the PAN, a token, the expiration date, the CVC, the name, etc.) via a keypad, or by tapping the card 106 on the mobile device 102 (whereupon the mobile device 102 wirelessly receives the information (e.g., via NFC, etc.)), and/or by capturing an image of the card 106 that includes the information, via a camera input device of the mobile device 102. Other identifiers may be added to the connect application 120 in a similar manner (as associated with cards or not).

The mobile device 102, as configured by the connect application 120, then transmits a request, to add the payment account (or card 106), in this example, to the profile of the user, to the host server 108, which includes the information provided from the user (e.g., the payment account details, the image of the card 106, etc.). In turn, the host server 108 is configured to extract card information from the image of the card 106 (e.g., extract the PAN or token using optical character recognition (OCR), etc.), if applicable (when such image is provided), and to append the card 106 to the profile of the user in the registration database 110. In connection therewith, the host server 108 is further configured to identify a representative image of the card 106 in the image database 112, for example, based on the BIN or part of the BIN, which identifies a particular issuer. The representative image includes a template illustration for the card, into which the PAN may be added by the mobile device 102, for example, when displayed at the mobile device 102. The image database 112 includes various different images for various different cards from various different issuers and/or payment networks (e.g., from Mastercard™, VISA™, American Express™, etc.). The images may be generic to an issuer, or specific to a user. The host server 108 is configured to then add the image to the profile for the card 106. In addition, the host server 108 may solicit and store other information as part of the profile generally or in connection with the specific card 106, such as, for example, email addresses (e.g., to receive receipts, etc.), identifiers, tokens, mobile application IDs, phone numbers, etc.

In this exemplary embodiment, the profile for the user in the registration database 110 includes at least a PAN for each payment account registered by the user and also the application ID for the connect application 120 included in the mobile device 102.

The host server 108 is configured to transmit a confirmation, to the mobile device 102, of adding the card 106 to the profile, where the confirmation includes, potentially, the card image from the image database 112. The mobile device 102, as configured by the connect application 120, receives and stores the image (when included in the confirmation) in association with the card 106 at the connect application 120 along with the PAN, token or other credential associated with the payment account linked to the card 106 (and/or data for generating a payment account credential for the payment account), and other details of the card 106 to be filled into the image when displayed at the mobile device 102.

The mobile device 102, as configured by the connect application 120, will repeat the above process for each of the cards and/or payment accounts (e.g., provisioned to a digital wallet, etc.) that the user decides to add to the connect application 120 and the profile included in the registration database 110.

In addition to registration of the particular payment accounts, the user may select one or more preferences related to services and/or actions available through the connect application 120. In general, services may include, for example, coupon services or loyalty services, etc., while action are completed or accomplished in the context of a service (e.g., send an email linked to a loyalty service, etc.). For example, the user may opt to receive receipts as emails at user@email.com (i.e., as a receipt service with an action indicating that the receipts should be emailed to the particular email address), or to have receipts pushed to the mobile device 102 (i.e., as a receipt service without an action), via the connect application 120. Likewise, the merchant may provide a loyalty service through managing a balance which includes no action, or send a notification to invite the user to visit their shop, which includes a different action. In other words, services may be associated with one or more actions, or not. In general, however, the registration database 110 will include the action along with all the necessary data (e.g., an email address, etc.) (received from the user or otherwise) to carry out or accomplished the actions defined by the services, as needed.

After registration, the user can then use the card 106 (and associated payment account) to initiate a transaction or other interaction at the ECR 104. In so doing, in one aspect, the user may tap, dip, or swipe the card 106 at the ECR 104, whereby the PAN or token for the payment account linked to the card 106 is transmitted to the ECR 104. While reference is made with specific reference to the card 106, the ECR 104 may receive the PAN or token from the mobile device 102, and specifically, a wallet application therein. Further, the description below generally refers to the PAN, but the description below may be equally applicable to a token or other credential specific to the payment account, or another type of information specific to the user (other than the PAN) (e.g., a loyalty identifier, a national ID, a social security number, a mobile phone number, an email address, etc.). Regardless, upon receipt of the PAN (or token), in this example, the ECR 104 is configured to pursue authorization of the transaction as is conventional.

In connection therewith (e.g., before, after, or at the same time as pursuing authorization, etc.), the ECR 104 is configured to inquire, from the registration database 110, whether the PAN and/or provided user information is registered or not. The inquiry includes the PAN and a merchant ID for the ECR 104. When not registered, the registration database 110 is configured to indicate not registered to the ECR 104, whereupon the ECR 104 continues (e.g., the ECR 104 submits an authorization request for the transaction, the ECR 104 prints a receipt, etc.). When registered, the registration database 110 is configured to further identify services associated with the PAN and the merchant ID (e.g., as indicated by preferences of the user or the merchant, etc.). The registration database 110 is configured to then encrypt the identified services and/or actions (underlying the identified services) (which includes personal identifying information necessary, helpful or associated with the action (e.g., email address, tokens, phone numbers, etc.)) and to transmit the encrypted services/actions (e.g., along with a uniform resource locator (URL) for the connect application 120 (broadly, an identifier of the connect application 120), as appropriate, etc.) to the ECR 104. The services/actions may be encrypted, in various embodiments, to ensure that the user remains anonymous to the ECR 104 (and more generally, the merchant or entity associated with the ECR 104) (by protecting the personal identifying information of the user). That said, the encryption of the services/actions, by the registration database 110, may be omitted in some embodiments.

In this embodiment, the exemplary action for which the user is registered includes a receipt service, which may be designated for email or notification (broadly, a service). The user may be registered for one or more additional services as well.

When the user is registered for receipt services/actions, the ECR 104 is configured to encode the receipt for the transaction (e.g., as a JSON token, etc.) and to post the encoded receipt, along with the PAN and the encrypted actions, to the host server 108. In response, the host server 108 is configured to identify the issuer of the user's payment account, for example, based on the PAN (or part thereof (e.g., BIN, etc.)). The host server 108 then transmits the encoded receipt to the storage server 114 (e.g., as linked to the issue of the user's payment account, or not; etc.). The storage server 114 may be a standalone computing device, as shown in FIG. 1, or part of the host server 108 in other embodiments. In one or more further embodiments, the storage server 114 may be associated with or included in the identified issuer. Regardless of location, the storage server 114 is configured to receive the receipt from the ECR 104, to store the receipt, and to make the receipt available for later viewing by the user (e.g., via the connect application 120, or potentially via an issuer's home banking application, etc.).

The host server 108 is further configured to decrypt the encrypted services/actions to determine what services/actions are to be initiated between the ECR 104 and the mobile device, if any. In various examples, the decrypted action includes an email designation for receipts (for the receipt service). As such, the host server 108 is configured to convert the encoded receipt to a different format suited for email (e.g., transcode the JSON token to HTML, or PDF, etc.) and to email the receipt in the different format to the user (e.g., at an email address included in the profile of the user in the registration database 110, etc.).

Additionally, or alternatively, in other examples, the decrypted action may include a notification designation for receipts, whereby the host server 108 is configured to generate a URL, to store the receipt at the URL, and to submit a request for a notification from the notification server 118. The request includes the URL for the receipt, the notification token (received during registration), the PAN, and the connect application ID, etc. The request may further include detail of the transaction and/or a description of the transaction to be included in the notification. The notification server 118 is then configured to identify the mobile device 102 (e.g., based on the PAN and/or the application ID for the connect application 120, etc.) and to confirm the notification token is genuine. When confirmed, the notification server 118 is configured to push a notification to the mobile device 102. Similar to the request, the notification includes the URL for the receipt and potentially a description of the transaction, etc.

In this example, the mobile device 102 is configured, in turn, to display the notification as a banner, whereupon the user is permitted to tap the banner. In response, the mobile device 102 is configured to open the connect application 120 and to display the card image for the card 106, for example, which includes the PAN and other information, as appropriate, included therein. The mobile device 102 is further configured, by the connect application 120, to offer the option to view the receipt. When the user taps the option, the mobile device 102 is configured to open the URL, whereby the receipt is displayed to the user.

Moreover in the system 100, when the user is registered for one or more value-added services, the ECR 104 is configured to connect to the conduit server 116 and provide the PAN and the encrypted actions to the conduit server 116.

In response, the conduit server 116 is configured to notify the host server 108 of the connection, with the PAN and the encrypted services/actions, and with the URL of the conduit server 116 if the latter would not be known to/embedded in the connect application 120. The host server 108 is configured to decrypt the encrypted services/actions and to request a notification to the notification server 118 for the connection. The request, as above, includes a notification token, the application ID for the user's connect application 120, the PAN, and the URL of the conduit server 116. The notification server 118 is then configured to identify the mobile device 102 (e.g., based on the PAN and/or the application ID, etc.) and to confirm the notification token is genuine. When confirmed, the notification server 118 is configured to push a notification to the mobile device 102. Similar to the request, the notification includes a description of the connection requested and/or the merchant associated with the ECR 104, etc. (and, potentially, the URL of the conduit server 116, for instance, if not known to/embedded in the connect application 120, etc.).

In connection therewith, the mobile device 102 is configured, in turn, to display the notification as a banner, whereupon the user is permitted to tap the banner. In response, the mobile device 102 is configured to open the connect application 120 and to display the card image for the card 106, for example, which includes the PAN and other information, as appropriate, included therein. The mobile device 102 is further configured, by the connect application 120, to connect to the conduit server 116 and to indicate a connection pending to the user (e.g., a spinner, etc.). The conduit server 116 is configured to pair the connections with the ECR 104 and the mobile device 102, and then to notify each of the ECR 104 and the mobile device 102 of the pairing. The ECR 104 and the mobile device 102 are further configured to then communicate, via the conduit server 116, to facilitate any of the value-added services.

In addition to the above (and as another option to establish extended communication with the mobile device 102), the ECR 104 may be configured to scan for BLE devices having an identifier associated with the PAN (or other identifier associated with other information of the user) received from the user in the interaction/transaction (e.g., a permutation of the PAN, or the PAN being a part of the identifier, etc.). The mobile device 102, in turn, may be configured to publish the identifier associated with the PAN to seek to pair with the ECR 104, either when the connect application 120 is opened, when a notification indicative of a request for a BLE connection is received, or otherwise (for instance, by permanently publishing the identifiers associated with PANs registered into the mobile device 102, etc.). When apparent to one another, the ECR 104 and the mobile device 102 are configured to pair, to thereby determine physical proximity and permit communication directly therebetween, apart from the conduit server 116.

It should be appreciated that a combination of the BLE communication and the conduit server communication may be employed in various embodiments. In one example, certain value-added services may be delivered via the BLE communication and conditional to the BLE communication being in place, meaning the user is at the location of the ECR 104 whereby the services may be more suitable. Conversely, other value-added services may be delivered through the conduit server 116, when the BLE communication is not available due to the location of the user relative to the ECR 104 (e.g., outside of BLE range, etc.). That said, either the BLE communication or the conduit server communication may be used, alone or in combination, as desired.

More generally, the connections, either directly (e.g., via BLE, etc.) or indirectly, via the conduit server 116, provide opportunities for a merchant or entity associated with the ECR 104 to further extend services to the mobile device 102, and specifically, the user. In various examples, through such extended interactions, the ECR 104 may be configured to then provide offers for value-added services (e.g., discounts, coupons, installment plans, vouchers, extended period transactions (e.g., tabs, shopping carts, etc.), adding tips to transactions, display of purchased products (e.g., real time listing of products being scanned, etc.), swapping of payment accounts (broadly, payment options), loyalty programs, personalized offers, warranty terms and offers, budget management tools, insurance options, etc.), etc., as described in more detail below.

It should also be appreciated that the extended dialogue between the merchant and the user is provided without the user providing additional personal information to the merchant (associated with the ECR 104). In general, the ECR 104 is configured, as described above, to act on information already received in connection with a payment account transaction (e.g., a PAN, etc.) or other interaction to connect with the mobile device 102 whereby enhanced communication is often provided with no additional information about the user.

Further, it should be appreciated that while only one mobile device 102, one ECR 104, one card 106, one host server 108, one registration database 110, one image database 112, one storage server 114, one conduit server 116, and one notification server 118 are illustrated in the system 100, additional ones of these parts (or combination of the parts) may be included in other system embodiments.

Figure 2:
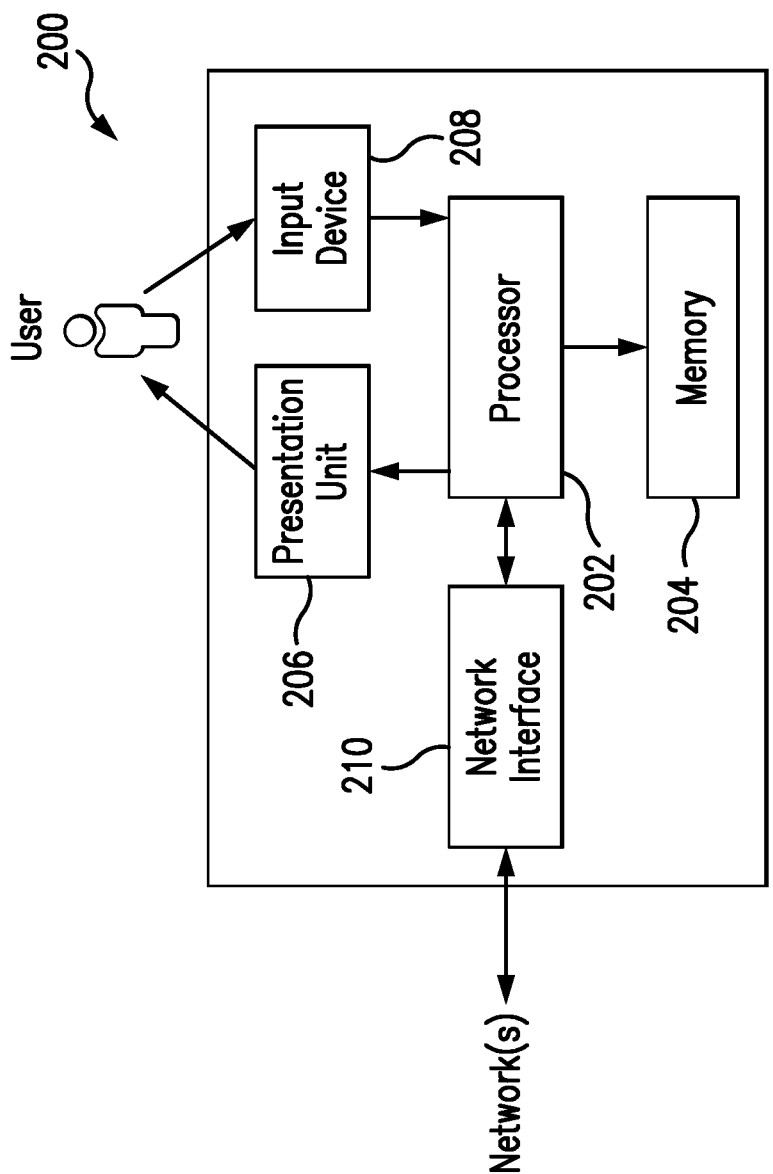
FIG. 2 is a block diagram of a computing device that may be used in the exemplary system of FIG. 1.

FIG. 2 illustrates a block diagram of an exemplary computing device 200 that can be used in the system 100 of FIG. 1. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to function as described herein.

In the exemplary embodiment of FIG. 1, each of the mobile device 102, the ECR 104, the host server 108, the registration database 110, the image database 112, the storage server 114, the conduit server 116, and the notification server 118 may be considered, may include, and/or may be implemented in a computing device consistent with the computing device 200, coupled to (and in communication with) one or more of the networks in the system 100. Further, the card 106 may be considered a computing device consistent, at least in part, with the computing device 200 (e.g., the card 106 generally will not include a presentation unit or a input device, etc.). The system 100, though, should not be considered to be limited to the computing device 200, as described below, as different computing devices and/or arrangements of computing devices may be used in other embodiments. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, PANs and/or other payment card (or payment account) information, device IDs, application IDs, tokens, notifications, user records, and/or other types of data (and/or data structures) suitable for use as described herein.

Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein (e.g., one or more of the operations of method 300 and/or method 500, etc.), whereby the computing device 200 may be transformed into a special purpose computing device upon performing (or based on performance of) the one or more of the operations.

In the exemplary embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information, visually or audibly, for example, to a user of the computing device 200 (e.g., coupons, transaction details, etc.), etc. And, various interfaces (e.g., as defined by the connect application 120, etc.) (e.g., interfaces illustrated in FIGS. 4 and/or 6 and/or 8, etc.) may be displayed at computing device 200, and in particular at presentation unit 206, to display certain information in connection therewith. The presentation unit 206 may include, without limitation, a liquid crystal display (LCD), a light-emitting diode (LED) display, an organic LED (OLED) display, speakers, etc. In some embodiments, the presentation unit 206 may include multiple devices.

In addition, the computing device 200 includes an input device 208 that receives inputs from the user (i.e., user inputs) of the computing device 200. The input device 208 may include a single input device or multiple input devices. The input device 208 is coupled to (and is in communication with) the processor 202 and may include, for example, one or more of a keyboard, a pointing device, a mouse, a camera, a touch sensitive panel (e.g., a touch pad or a touch screen, etc.), another computing device, and/or an audio input device. In various exemplary embodiments, a touch screen, such as that included in a tablet, a smartphone, or similar device, may behave as both the presentation unit 206 and the input device 208.

Further, the illustrated computing device 200 also includes a network interface 210 coupled to (and in communication with) the processor 202 and the memory 204. The network interface 210 may include, without limitation, a wired network adapter, a wireless network adapter (e.g., a NFC adapter, a Bluetooth™ adapter, etc.), a mobile network adapter, or other device capable of communicating to one or more different networks herein and/or with other devices described herein. In some exemplary embodiments, the computing device 200 may include the processor 202 and one or more network interfaces incorporated into or with the processor 202. What's more, while only one network interface device 210 is illustrated in FIG. 2, multiple network interfaces may be generally included in computing devices described herein. Specifically, for example, the ECR 104 may include, separately or in combination, a NFC interface device, a Bluetooth™ interface device, and a Wi-Fi™ network device, each suitable to provide a wireless connection (and each broadly a network interface).

Figure 3:
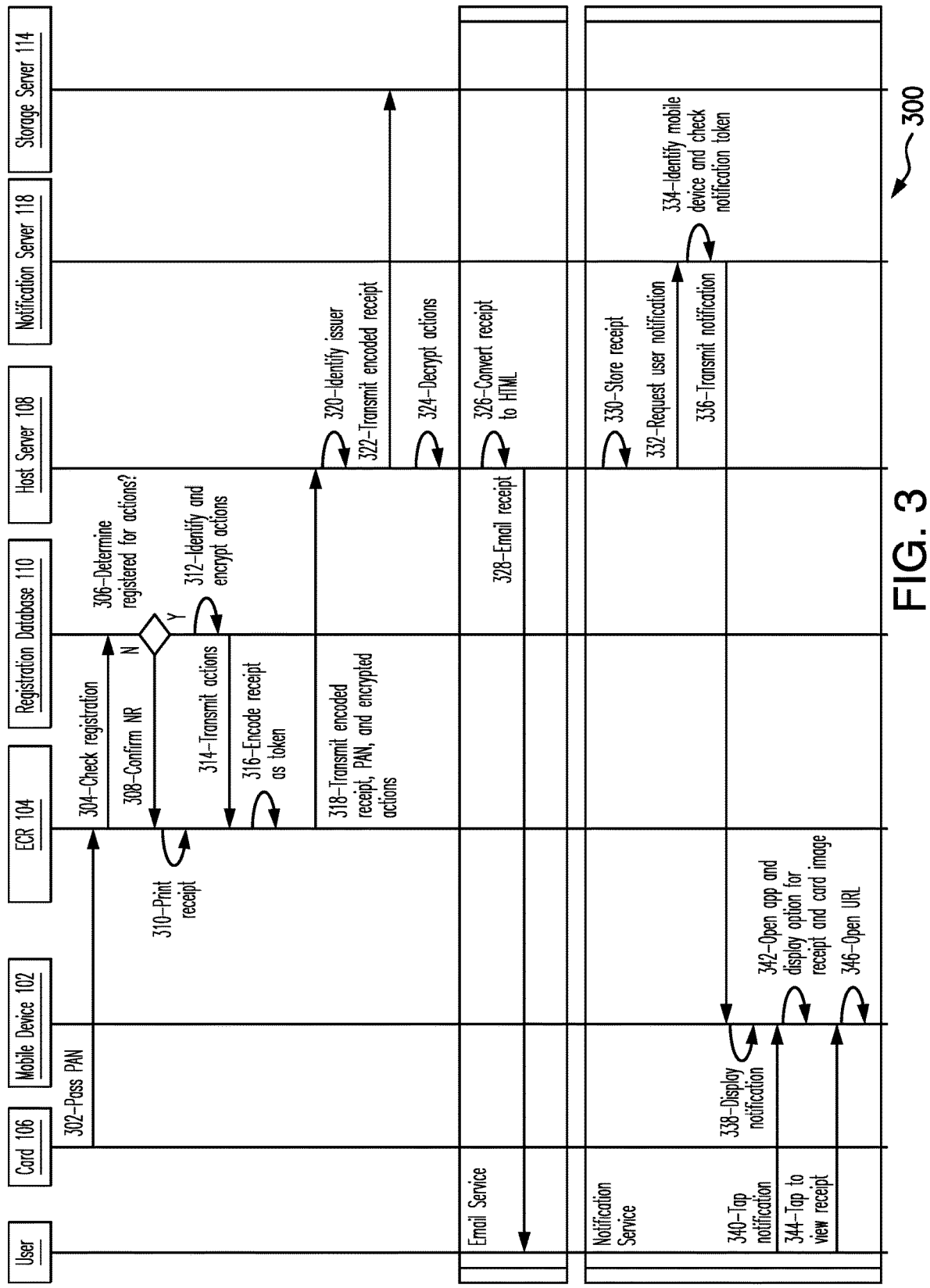
FIG. 3 illustrates an exemplary method, which may be implemented in connection with the system of FIG. 1, for extending a dialogue between a mobile device and a POI.

FIG. 3 illustrates an exemplary method 300 for use in extending dialogue between a mobile device and a POI in connection with a card or mobile device initiated interaction at the POI. The exemplary method 300 is described as implemented in system 100 and with additional reference to the computing device 200. However, the methods herein should not be understood to be limited to the system 100 or the computing device 200, as the methods may be implemented in other systems and/or computing devices. Likewise, the systems and the computing devices herein should not be understood to be limited to the exemplary method 300.

The method 300 is further described with reference to the exemplary interfaces illustrated in FIG. 4. That said, it should be appreciated that other interfaces may be presented at the mobile device 102, in connection with method 300 and other method embodiments.

At the outset in the method 300, it is assumed that the connect application 120 is installed in the mobile device 102 and that multiple payment accounts are registered to the connect application 120, whereby a profile is included in the registration database 110 for the user and the mobile device 102. When the user interacts with the ECR 104, the user will tap, dip, or swipe the card 106 at the ECR 104, whereupon the card 106 passes the PAN (or another identifier) for the user's payment account to the ECR 104, at 302. The PAN (or other identifier) includes (or is indicative of) the primary account number for the payment account linked to the card 106. That said, the number (or identifier) provided to the ECR 104 may broadly be any identifier associated with the user's payment account (e.g., a token from a payment application included in the mobile device 102 such as a payment account reference (PAR), another identifier associated with and/or indicative of the payment account, etc.). Other identifiers specific to the mobile device 102, the user, or the connect application 120 included in the mobile device 102 may similarly be used (instead of the PAN or PAR) in other embodiments.

The ECR 104 checks, at 304, registration of the PAN (or other provided number) with the registration database 110. This may include submitting a registration check, which includes at least the PAN and potentially also includes other related information about the card 106 or the user or the merchant associated with the ECR 104. Specifically, for example, the ECR 104 may submit a merchant ID for the merchant associated with the ECR 104. The registration database 110, in turn, determines whether the PAN (or another identifier) is registered for one or more actions, at 306. In general, the registration database 110 may search for the PAN in a listing or registered PANs, or search the profiles stored therein for the PAN. When the PAN is not registered, the registration database 110 confirms, at 308, no registration or NR to the ECR 104. In turn, the ECR 104 prints, at 310, the receipt for the user and physically delivers the printed receipt to the user.

Conversely, when the PAN is registered, the registration database 110 identifies and encrypts the one or more actions, at 312, associated with the PAN (and services to which the PAN is registered, as applicable). The one or more services/actions are identified based on the PAN, and potentially, also the merchant ID, which indicates what services or actions the user has opted (or allowed) to support for the particular merchant. Example actions may include transmitting notifications and/or communications associated with receipt services, value-added services (e.g., coupons, offers, installment payments, continuous tab, etc.), etc. The registration database 110 then transmits, at 314, the encrypted actions to the ECR 104. The registration database 110 may further include, as appropriate for the actions, the PAN, the application ID for the connect application 120, the notification token, the email address of the user (broadly, contact information), etc.

In this exemplary embodiment, the service identified for the PAN and the merchant ID includes a receipt service, which may be identified in the encrypted actions or simply understood by the ECR 104. As such, the ECR 104 encodes, at 316, the receipt as a token and/or in a suitable format, such as, for example, a JSON token. It should be appreciated that encoding the receipt is not limited to JSON tokens and that the receipt may be encoded in a variety of different manners to enables the method 300 to continue as described herein. The ECR 104 then transmits, at 318, the encoded receipt, the PAN and the encrypted service(s) to the host server 108. The ECR 104 may further transmit details of the interaction, including, for example, details of a receipt for a payment account transaction.

The host server 108, in turn, identifies, at 320, the issuer associated with the user's payment account (based on the PAN) and transmits, at 322, the encoded receipt to the storage server 114, which in this embodiment, is associated with the issuer of the payment account associated with the PAN. As such, the host server 108 may identify the issuer based on the PAN (or part of the PAN, such as, for example, the BIN or part thereof) and then transmit the encoded receipt to the storage server associated with the issuer, i.e., the storage server 114 in this embodiment. In addition, the host server 108 decrypts, at 324, the actions from the encrypted actions received from the ECR 104. When decrypted, the host server 108 proceeds to facilitate the actions, for instance, by setting up a connection between the mobile device 102 and the ECR 104, through the conduit server 116 or otherwise.

In the exemplary method 300, the decrypted actions include two potential actions, i.e., an email action and notification action. Each of the actions is designated by a corresponding sub-process box in FIG. 3.

For the email sub-process, if desired by the user (and/or the merchant associated with the ECR 104), the host server 108 converts, at 326, the receipt token to a suitable format and emails, at 328, the receipt to the user at an email address associated with the user (and received with the encrypted action and included in the profile of the user at the registration database 110, etc.). The receipt may be converted, for example, from the JSON token to a HTML, format, which is conveniently emailed to the user. The user may then access the receipt by accessing the email through an email browser.

Additionally, or alternatively, in the notification sub-process, if desired by the user (and/or the merchant associated with the ECR 104), the host server 108 stores the receipt, at 330. The host server 108 then requests, at 332, that the notification server 118 notify the user of the receipt. The request provides a wake-up call to the connect application 120 in the mobile device 102. The request includes, for example, the notification token for the notification server 118 received during installation of the connect application 120 at the user's mobile device 102 and information on the availability of the receipt.

In response, the notification server 118 identifies, at 334, the mobile device 102 (e.g., based on the notification token, etc.) and checks the notification token received from the host server 108. When confirmed, the notification server 118 transmits, at 336, a notification to the user at the mobile device 102, which includes at least the information on the availability of a receipt and the PAN for the card 106. In turn, the mobile device 102 displays, at 338, the notification to the user indicating, for example, that a receipt is available or a notification associated with the connect application 120 has been received. In connection therewith, and as shown in FIG. 4, the example interface 402 may be displayed to the user at the mobile device 102, whereupon the notification appears as a banner. In this example, the notification indicates a name of a merchant and an amount of a transaction (i.e., as initiated by the user presenting the card 106 to the merchant).

The user, in response, taps, at 340, the notification, whereupon the mobile device 102 opens, at 342, the connect application 120, which causes the mobile device 102 to display a card image for the card 106 (retrieved from memory) and an option to view the receipt. FIG. 4 illustrates an example interface 404, which may be displayed at the mobile device 102 by the connect application 120 following such tap of the notification. The interface 404 includes an image of the card 106 (or representation thereof) (e.g., an image retrieved from the image database 112, etc.) and an amount of the transaction, i.e., $4.75. The interface 404 further includes a query to the user to view the receipt for the transaction, with the options Yes or No. Then in the method 300, when the user selects to view the receipt (e.g., the Yes option in the interface 404, or a view receipt option in another interface, etc.), the user taps, at 344, the option to view the receipt.

Upon confirmation that the user wants to retrieve the receipt, the host server 108 may transmit the receipt to the mobile device 102 (and/or to the connect application 120) or, alternatively, generate a URL (broadly, a web address) for the receipt, store the receipt at this URL and inform the mobile device 102 and/or the connect application 120 about the URL, so that the connect application 120 can retrieve the receipt at the URL. In response to the latter, for example, the mobile device 102 opens the URL for the receipt, at 346, whereupon the receipt is displayed to the user at the mobile device 102. FIG. 4 further includes an example interface 406, which includes the detail of the receipt either sent by the host server 108 to the mobile device 102 or retrieved via the URL accessed by the connect application 120 following selection of the Yes option in the interface 404. As shown, the interface 406 includes, again, the merchant involved in the transaction, the amount of the transaction, and also the details of the transaction.

Figure 4:
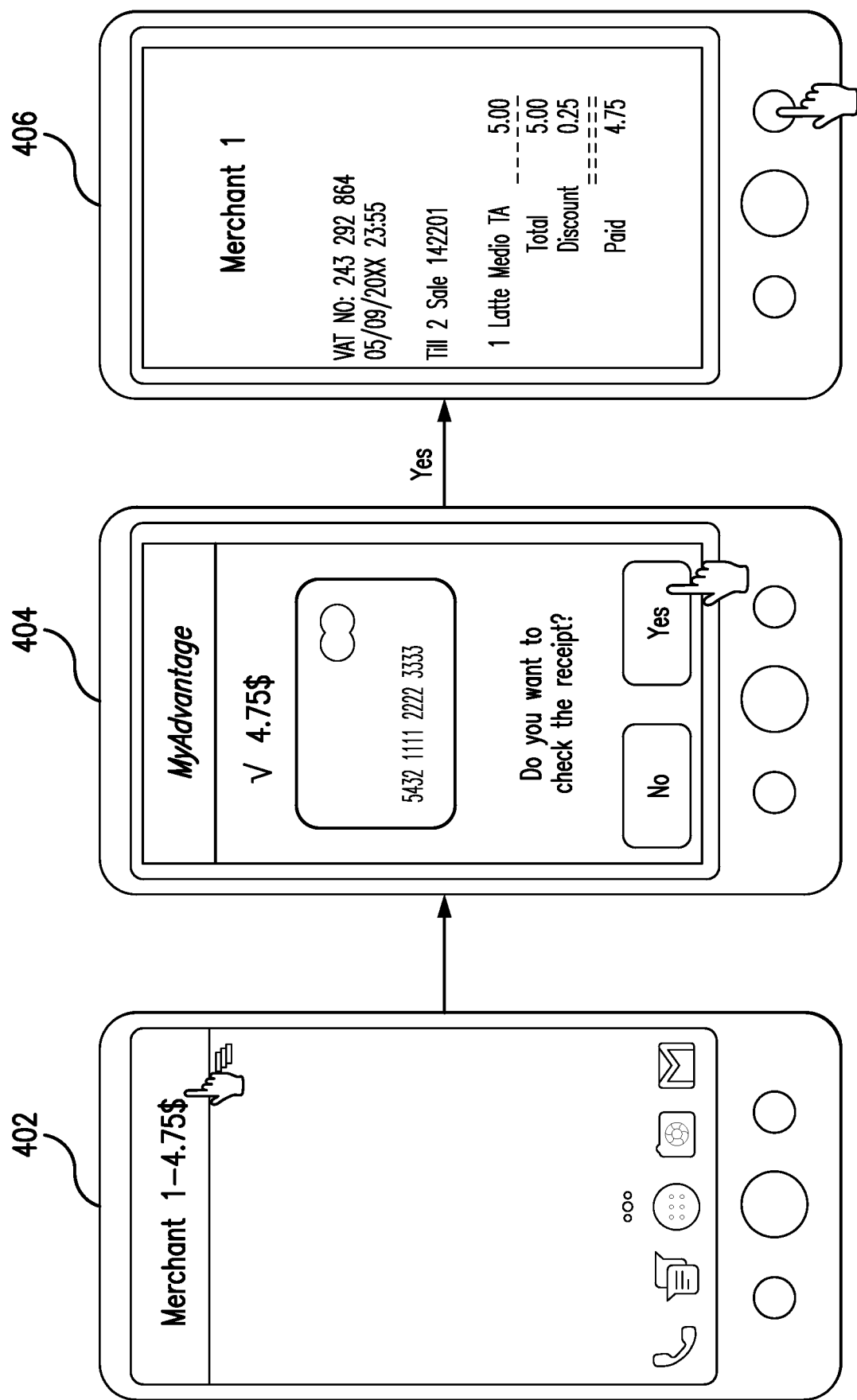
FIG. 4 illustrates an exemplary series of interfaces that may be displayed to a user in connection with extending a dialogue between a mobile device and a POI in the system of FIG. 1 and/or the method of FIG. 3.

It should be appreciated that the interfaces of FIG. 4 are merely exemplary in nature and that other interfaces may be employed with the method 300, or variations thereof, in other embodiments.

FIG. 5 illustrates an exemplary method 500 for use in extending dialogue between a mobile device and a POI in connection with a card or mobile device initiated interaction at the POI. The exemplary method 500 is described as implemented in the system 100 and with additional reference to the computing device 200. However, the methods herein should not be understood to be limited to the system 100 or the computing device 200, as the methods may be implemented in other systems and/or computing devices. Likewise, the systems and the computing devices herein should not be understood to be limited to the exemplary method 500.

The method 500 is further described with reference to the exemplary interfaces illustrated in FIG. 6. That said, it should be appreciated that other interfaces may be presented at the mobile device 102, in connection with method 500 and other method embodiments. Further, and like above with respect to the method 300, it is assumed that the connect application 120 is installed in the mobile device 102 and that multiple payment accounts are registered to the connect application 120, whereby a profile is included in the registration database 110 for the user and the mobile device 102.

That said, at the outset in the method 500, the initial part of the method 300, including steps 302-310, are incorporated by reference (as being performed prior to operation 502). As such, when the PAN (or other identifier associated with the user's payment account) is registered, the registration database 110 identifies and encrypts, at 502, the actions associated with the PAN (or other identifier) and the merchant ID (or other ID) associated with the ECR 104. Here, the identified action(s) are identified as underlying or part of a value-added service (VAS). It should be appreciated, however, that the identified action(s) or service(s) may further include the receipt actions (e.g., for email or notification or otherwise, etc.) described above, whereby multiple action would be identified at 502.

The registration database 110 then, at 504, transmits the encrypted actions to the ECR 104. The ECR 104, upon receipt of the encrypted actions, connects with the conduit server 116, at 506. The connection includes a presentation of the PAN for the card 106 and the encrypted actions to the conduit server 116. It should be appreciated that the request may include additional information related to the interaction, the ECR 104, or the card 106, etc. Upon receipt of the request, the conduit server 116 notifies the host server 108, at 508, of the request for an extended connection between the ECR 104 and the mobile device 102, from the ECR 104, and provides the encrypted actions.

The host server 108, in turn, decrypts the actions, at 510, and identifies the VAS action to be provided via a connection between the ECR 104 and the mobile device 102. The host server 108 then requests a user notification of the connection from the notification server 118, at 512. The request to the notification server 118, as above, includes the notification token for the mobile device 102, as retrieved from the profile associated with the user in the registration database 110 (and included with the encrypted actions at 504 or separately acquired therefrom). In addition, the request includes an application ID for the connect application 120 in the mobile device, the PAN for the card 106, and a URL for the conduit server 116.

The notification server 118 identifies the mobile device 102 and checks the notification token, at 514. When the notification token is confirmed, the notification server 118 transmits, at 516, a notification to the user at the mobile device 102. In this manner, the notification provides a wake-up call to the connect application 120 in the mobile device 102. Upon receipt of the notification, the mobile device, displays, at 518, the notification to the user at the mobile device 102. In connection therewith, FIG. 6 includes an example interface 602, which may be displayed at the mobile device 102, and which includes a notification banner at the top of the interface indicating an interaction with Merchant 2. In response in the method 500, the user taps, at 520, the notification and the mobile device 102 opens the connect application 120 and displays a representative image of the card 106, at 522. As above, the image of the card 106 is received from the image database, via the registration database 110 in connection with registration of the card 106. And, the mobile device 102 requests connection, at 524, to the conduit server 116 (e.g., based on a URL of the conduit server 116 known to and/or embedded in the connect application 120, based on a URL of the conduit server 116 included in the notification from the notification server 118, or otherwise, etc.) and displays, at 526, a spinner, while the connection between the mobile device 102 and the ECR 104 is established. The connection includes a presentation of a PAN to the conduit server 116. FIG. 6 illustrates an exemplary interface 604, which includes the card image for the card 106 and the spinner.

In turn, the conduit server 116 pairs, at 528, the connections with the mobile device 102 and the ECR 104 (from steps 506 and 524) based on the PAN. The conduit server 116 then informs the ECR 104 of the connection, at 530, and informs the connect application 120 of the mobile device 102 of the connection, at 532. Thereafter, messages may be exchanged between the ECR 104 and the mobile device 102, via the conduit server 116 (broadly, as a first wireless connection). In connection therewith, enabling the first wireless connection may include, for example, transmitting a PAN for the registered card 106 to the conduit server 116, whereby the conduit server 116 transmits a wake-up call to the connect application 120 at the mobile device 102, through a notification to establish the first wireless connection, via a wireless interface, wherein the notification includes the PAN, the identifier, and/or a uniform resource locator (URL) of the conduit server 116 to connect to the conduit server 116. In turn, this may permit the mobile device 102 to connect to the conduit server 116 based on the PAN, the identifier, and/or the URL to thereby complete the first wireless connection between the ECR 104 and the mobile device 102 (via the conduit server 116).

In addition, a second wireless connection may also be established between the ECR 104 and the mobile device 102 (i.e., a direct wireless connection). Enabling the second wireless connection may include detecting a service associated with the PAN, for example, published by the mobile device 102 in response to the wakeup call (e.g., from the conduit server 116, etc.), to thereby complete the second wireless connection between the ECR 104 and the mobile device 102. The second wireless connection may include, for example, a Bluetooth™ Low Energy wireless connection and/or a local wireless connection indicative of the mobile device 102 being present at a merchant associated with the ECR 104, etc. A first part of content may then be transmitted through the wireless connection that is established first (either the first or second wireless connection) and another part (or a second, different part) of the content may be transmitted through the wireless connection that is established second. It should be appreciated that one wireless connection may be preferred over another, for example, based on bandwidth and/or read range (generally capacity) (e.g., based on a particular type of wireless connection (e.g., Bluetooth™ versus Wi-Fi™, etc.), or direct or indirect wireless connection, or potentially based on measurement of bandwidth and/or read range, etc.), whereby one of the wireless connections may be terminated when the wireless connection with the better bandwidth and/or read time is in place (e.g., based on a capacity of the connections (e.g., keep the connection that has superior, better, enhanced, etc. capacity relative to the other; etc.), etc.). It should be further appreciated that both of the first and second wireless connections may be maintained, or one may be terminated based on the above.

In one implementation of the above, the message(s) exchanged between the ECR 104 and the mobile device 102 may relate to one or more payment accounts registered to the connect application 120. For example, the card 106 may have been used to initiate a payment account transaction for a product with a merchant associated with the ECR 104, while another payment account (registered to the connect application 120) is associated with a discount at the merchant. In such an example, the ECR 104 may notify the connect application 120 of a discount for a particular type of issuer or payment account, or conversely, the connect application 120 may specifically identify the discount for the payment account registered thereto based on identification of the merchant. In connection therewith, when beneficial, the user may select the other payment account, whereupon, as shown in the exemplary interface 606 of FIG. 6, the connect application 120 requests that the user authenticate himself/herself. When authenticated, the transaction is redefined in the connect application 120, for example, as in interface 608.

As shown, the transaction with the Merchant 2 is shown in the amount of $5.00 along with the option to select the 5% discount at the bottom. When the user selects the discount, an interface 610 is displayed at the mobile device 102, to invite the user to confirm the payment account to be used and the discounted transaction amount.

Upon the user's confirmation, the ECR 104 authorizes the transaction with the PAN (or token or other credential) associated with the other payment account from the mobile device 102, and further nullifies the transaction with the prior payment account (e.g., via a refund transaction, etc.). Thereafter, an interface 612 is displayed at the mobile device 102 indicating the transaction is complete, and offering the option to view a receipt. When the user opts to view the receipt, an interface 614 is displayed at the mobile device 102 showing the details of the transaction, as described above. In this exemplary implementation, the subsequent dialogue between the ECR 104 and the mobile device 102 permits the user to select a different payment account to take advantage of offers, discounts, etc. associated with that other payment account.

In another implementation, the connection between the ECR 104 and the mobile device 102 may be both direct, via BLE, and indirect, via the conduit server 116. In connection therewith, the initial interaction by the user at the ECR 104 captures the PAN and establishes the direct connection as described above. A pre-authorization for a transaction by the user at the merchant may then be facilitated by the ECR 104. When approved, the ECR 104 establishes a tab or shopping cart for the user, with products added thereto when ordered and/or scanned. The ECR 104 may communicate with the mobile device 102 directly or indirectly to permit the orders or scans. The ECR 104 further identifies the mobile device 102 as present at the merchant via the ability to establish the direct connection, via BLE, for example. When the user leaves the merchant, the ECR 104 loses the direct connection with the mobile device 102 (i.e., indicating the user has left the merchant), and initiates a transaction to pay the tab or purchase the shopping cart, whereby a transaction is initiated for the purchase. The ECR 104 may coordinate delivery of a receipt consistent with the description above, via the indirect connection, thereby providing an efficient purchase flow leveraging the direct and indirect connections between the mobile device 102 and the ECR 104.

In yet another implementation, as illustrated in FIG. 7, an exemplary method 700 is disclosed for use in extending dialogue between a mobile device and a POI in connection with a card or mobile device initiated interaction at the POI. The exemplary method 700 is described as implemented in system 100 and with additional reference to the computing device 200. However, again, the methods herein should not be understood to be limited to the system 100 or the computing device 200, as the methods may be implemented in other systems and/or computing devices. Likewise, the systems and the computing devices herein should not be understood to be limited to the exemplary method 700.

It should be appreciated that the method 700 may be included with and/or in addition to the methods 300 and 500. That said, the method 700 relates to further enrolling the user for actions associated with the merchant or other entity associated with the ECR 104. As will be described below, the actions may include provision of, by the merchant to the user, receipts, coupons, installment plans, vouchers, and/or extended period transactions, or the action may include the addition of a tip, displaying purchased products, payment options, loyalty programs, personalized offers, warranty terms and offers, budget management tools, and/or insurance options. In this example, the action relates specifically to email offers.

Initially in the method 700, the user taps, dips, or swipes the card 106 with the ECR 104, as part of performing a transaction at the merchant associated with the ECR 104. In response, the card passes, at 702, the PAN (or other identifier) for the payment account linked to the card 106 to the ECR 104. Like in the method 300, the ECR 104 then checks, at 704, registration of the PAN (or other provided number) with the registration database 110. This may include submitting a registration check, which includes at least the PAN and potentially also includes other related information about the card 106 or the user or the merchant associated with the ECR 104. Specifically, for example, the ECR 104 may submit the PAN for the user's account and a merchant ID for the merchant associated with the ECR 104. The registration database 110, in turn, determines whether the PAN is registered for one or more actions, and identifies, at 706, the services and/or actions for which the card 106 is registered, back to the ECR 104. This may include providing an instruction related to a service for which the PAN is registered, and also including with the instruction encrypted actions associated with the service, back to the ECR 104. Here, the identified service includes two services, a receipt service (as described above with reference to FIG. 3) and a VAS service (as described above with reference to FIG. 5). The ECR 104 receives the identification of the receipt service and the VAS service, and the encrypted actions related thereto. And, in turn, based on the receipt service, the ECR 104 delivers a receipt for the transaction to the user and sets up a connection with the mobile device 102 as above to provide the VAS service.

Thereafter in this example, the merchant associated with the ECR 104 is permitted to solicit permission from the user for additional value-added services. In particular herein, the ECR 104 offers, at 708, to send bi-weekly deals to the user through email. The offer (broadly a request for permission, etc.) includes, for example, a detailed description of the deals to be sent, the name of the merchant associated with the deals, a duration of the deals, other terms and conditions, and the data needed in order to enroll for the deals. In this example, the ECR 104 is specifically soliciting an email address for the user, as part of soliciting the permission (as part of the offer). The offer is then received at the user's mobile device 102 and displayed to the user, for example, in a banner or otherwise.

In response, the user accepts, at 710, the offer, whereupon the mobile device 102, via the connect application 120, collects the resources that are required for the long-term engagement (i.e., the long-term provision of such bi-weekly deals). In this example, the mobile device 102 gets/retrieves the email address for the user and encrypts the email address, at 712. What's more, the mobile device 102 signs the offer, at 714, thereby binding the offer from the merchant with the merchant (broadly, the requestor) by the signature of the connect application 120. Specifically, by signing or accepting the offer from the merchant ("Do you agree to receiving biweekly offers through email"), together with the user's email address, one or more additional entities (e.g., a third party, etc.) is permitted to inspect the 'contract' that was established between the user and merchant, whereby terms of the contract may be relied upon to send emails or to enforce against the merchant, etc. (e.g., ensure that the contract is respected, etc.). The bound contract may also be used in connection with one or more audits, if, for instance, a regulator would want to check that the user's interests are protected. That said, as shown in FIG. 7, the mobile device 102 then transmits, at 716, the signed offer along with the encrypted email address (broadly, an encrypted resource) back to the ECR 104, through the connection (e.g., directly or via the conduit server 116, etc.).

The ECR 104, in turn, registers, at 718, the accepted offer with the registration database 110. In doing so, the ECR 104 provides the encrypted resource and the signed offer to the registration database 110. The registration database 110 decrypts, at 720, the resource, which is the email address in this example, and further generates a proxy email address, at 722, which acts as an alias for the user's email address (e.g., whereby the merchant is permitted to communicate with the user's email address without knowing the actual email address of the user). The registration database 110 further stores, at 724, the decrypted email address, the proxy email address, and the signed offer therein. And, finally, the registration database 110 notifies, at 726, the ECR 104 of the registration whereby the proxy email address is provided to the ECR 104. The ECR 104 (or associated device of the merchant) is then able to provide the bi-weekly offers to the user via the proxy email address. In particular, for use of the proxy email, the owner or operator or affiliate of a domain name of the proxy email address (e.g., the host server 108 or associated entity (e.g., payment network (e.g., Mastercard, etc.), etc.), etc.) would receive the email on the proxy address, collect the actual email address from the registration database 110 and forward the email to the user, thereby providing the bi-weekly offers while masking the actual email address of the user obscured from the ECR 104.

In additional exemplary embodiments, the connect application 120 may display a variety of different interfaces to facilitate interactions between the user and one or more aspects of the system 100, for example. The interactions may be associated with a transaction (broadly, interaction) between the ECR 104 and the mobile device 102 as described in the embodiments and implementations above, or potentially, apart from an interaction between the ECR 104 and the mobile device 102. For example, the connect application 120 may be used to access a receipt from a prior transaction. Specifically, FIG. 8 illustrates a series of exemplary interfaces, which may be displayed at the mobile device 102 in connection therewith.

As shown in FIG. 8, when a user decides to view a receipt for a prior transaction, the user access the connect application 120 at the mobile device 102 as in interface 802, by selecting the connect application 120. In response, the connect application 120 is opened at the mobile device 102, whereupon the interface 804 is displayed. The interface 804 gives the user the options to check receipts, add a card (as described above), or change preferences. In this series of interfaces, the user selects the "check receipt" option, as indicated by the pointer finger.

In response, the connect application 120 displays the interface 806, at the mobile device 102, in which the connect application 120 solicits an authentication input from the user. Here, the authentication input is a fingerprint, but it should be appreciated that another authentication input, such as a different biometric, a PIN, a passcode, etc. may be employed to authenticate the user. At the interface 806, the user provides the authentication input, which is captured by the mobile device 102 and compared to a biometric reference either included at the mobile device 102 (e.g., in a secure element, etc.) or stored remotely therefrom. When the user is authenticated, the connect application 120 displays interface 808, which includes an image of the cards registered to the connect application 120 for the user. The user may then select the card associated with the payment account for the receipt to be viewed. In turn, the connect application 120 displays interface 810, which includes a listing of transactions to the payment account. The user may select the banner associated with a transaction of interest, whereupon the receipt will be displayed. In this exemplary embodiment, the banner is associated with a URL for the receipt (e.g., as generated at 330 in the method 300, etc.), whereby the receipt is displayed.

It should be appreciated that a variety of different interfaces may be employed in the systems and methods herein, within the scope of the present disclosure, to facilitate interactions between the user of the mobile device 102 and the ECR 104, the host server 108, the registration database 110, the conduit server 116, and/or the notification server 118, etc.

In some example embodiments of the present disclosure, a computer-implemented method for use in extending dialogue between a mobile device and a point-of-interaction may include receiving, at a mobile device of a user, from a notification server, a notification to communicate with a point-of-interaction (POI) computing device in connection with an interaction between a card of the user and the POI computing device, opening a connect application, at the mobile device, and displaying an image of the card, and connecting with the conduit server. The method may then include communicating with the POI computing device, via the conduit server, thereby extending dialogue between the POI computing device and user, via the mobile device, beyond the interaction. In some implementations of these embodiments, the dialogue relates to receipts, discounts, coupons, installment plans, vouchers, extended period transactions, adding tips, displaying purchased products, payment options, loyalty programs, personalized offers, warranty terms and offers, budget management tools, and/or insurance options. Further, in some implementations of these embodiments, the interaction includes a payment account transaction to an account; the identifier includes a primary account number (PAN) associated with the account; and/or the POI computing device includes an electronic cash register (ECR).

In addition, in some example embodiments of the present disclosure, a computer-implemented method for use in extending dialogue between a mobile device and a point-of-interaction may include retrieving, by a point-of-interaction (POI) computing device, actions associated with a registered card and an identifier associated with the POI computing device in connection with an interaction by the card with the POI computing device, and enabling, by the POI computing device, a first and second wireless connection with a mobile device of a user associated with the card. In such embodiments, enabling the first wireless connection includes transmitting a primary account number (PAN) for the registered card to a conduit server, whereby the conduit server transmits a wake-up call to a connect application at the mobile device, through a notification to establish the first wireless connection, via a wireless interface, wherein the notification includes the PAN and the identifier or a uniform resource locator (URL) of the conduit server to connect to the conduit server, thereby permitting the mobile device to connect to the conduit server based on the PAN, the identifier, and/or the URL to thereby complete the first wireless connection between the POI computing device and the mobile device via the conduit server. And, enabling the second wireless connection includes detecting a service associated with the PAN, published by the mobile device in response to the wakeup call, to thereby complete the second wireless connection between the POI computing device and the mobile device. In some implementations of these embodiments, the second wireless connection includes a Bluetooth™ Low Energy wireless connection and/or the second wireless connection includes a local wireless connection indicative of the mobile device being present at a merchant associated with the POI computing device.

In some implementations of these embodiments, the computer-implemented method may further include communicating a first part of content through the wireless connection that is established first and the remaining part (or a second, different part) of the content through the wireless connection that is established second, where the wireless connection established first is terminated when the wireless connection established second is in place. Additionally, or alternatively, in some implementations, the computer-implemented method may further include terminating the wireless connection that is established first when the wireless connection that is established second is deemed superior for the specific use case. And, the computer-implemented method may additionally (or alternatively) include, in some implementations, transmitting content from the POI computing device to the mobile device, where the content is dependent on whether the second wireless connection is enabled, based on a vicinity of the mobile device to the POI computing device.

In view of the above, the systems and method herein may provide extended dialogue between users and entities (e.g., merchants, etc.), through an additional connection between mobile devices of the users and POIs of the merchants, either directly or via a conduit server and/or notification server. The extended dialogue provides the basis for enhanced interactions, such as authentication, offers, coupons, checkout details (e.g., pricing, descriptions, images of products, etc.), etc. For card payments and/or contactless payments (either mobile device or card based), this is a new dialogue not previously permitted, and supported by new connection(s) layered on top of a swipe, dip, or tap initial communication with the POI. The systems and methods herein thus generally extend the functionality of the devices involved in such interactions to further enhance the user experience.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following operations: (a) receiving, at a point-of-interaction (POI) computing device, an identifier for an interaction with a user, the identifier specific to a card associated with an account of the user; (b) submitting, by the POI computing device, a request for the identifier to a registration database to determine whether the account is registered for one or more services; (c) in response to the request, receiving a list of one or more services and encrypted one or more actions associated with the one or more services, thereby indicating the account is registered with the registration database for said one or more services; (d) encoding, by the POI computing device, a receipt for the interaction; and (e) transmitting, by the POI computing device, the encoded receipt and the encrypted one or more actions to a server for initiating the encrypted one or more actions between the POI computing device and a mobile device associated with the user.

As will also be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following operations: (a) receiving, by a host server, from a point-of-interaction (POI) computing device, an identifier specific to an account of a user, a receipt for an interaction, and one or more encrypted actions; (b) decrypting the one or more encrypted actions; (c) storing the receipt (e.g., at a uniform resource locator (URL), etc.); and (d) requesting, by the host server, from a notification server, transmission of a notification to a mobile device of the user, whereby the mobile device is informed about the availability of and means to access the receipt (e.g., based on transmission of the receipt to the mobile device, based on the URL, or otherwise, etc.).

As will also be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following operations: (a) receiving, by a host server, a notice of a connection between a conduit server and a point-of-interaction (POI) computing device in connection with (or in relation to) an interaction between a user and the POI computing device, the notification including an identifier specific to an account of the user, and at least one encrypted action (and, in some examples, a uniform resource locator (URL) of the conduit server, etc.); (b) decrypting the at least one encrypted action; and (c) requesting, by the host server, from a notification server, transmittal of a notification of the connection between the conduit server and the POI computing device to a mobile device of the user, whereby the mobile device connects to the conduit server to communicate with the POI computing device, via the conduit server.

As will also be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following operations: (a) receiving, at a mobile device of a user, from a notification server, a notification to communicate with a point-of-interaction (POI) computing device in connection with (or in relation to) an interaction between a card of the user and the POI computing device (wherein, in some examples, the notification may include a uniform resource locator (URL) of the conduit server, etc.); (b) opening a connect application, at the mobile device, and displaying an image of the card; (c) connecting with the conduit server (via the URL or otherwise); and (d) communicating with the POI computing device, via the conduit server, thereby extending dialogue between the POI computing device and user, via the mobile device, beyond the interaction.

As will also be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following operations: (a) retrieving, by a point-of-interaction (POI) computing device, actions associated with a registered card and an identifier associated with the POI computing device in connection with an interaction by the card with the POI computing device; (b) enabling, by the POI computing device, a first and second wireless connection with a mobile device of a user associated with the card, wherein enabling the first and second wireless connection includes transmitting a primary account number (PAN) or equivalent identifier for the registered card to a conduit server, whereby the conduit server transmits a wake-up call to a connect application at the mobile device, through a notification to establish the first and second wireless connection, via a wireless interface, wherein the first wireless connection is established by connecting to the conduit server and the second wireless connection is established by the POI computing device scanning for the mobile device publishing a service associated with the PAN (or equivalent identifier); (c) publishing a service associated with the PAN (or equivalent identifier), to thereby establish the second wireless connection; (d) communicating a first part of content through the wireless connection that is established first and the remaining part (or a second, different part) of the content through the wireless connection that is established second, where the wireless connection with the lesser bandwidth and/or read range (e.g., based on a particular type of wireless connection (e.g., Bluetooth™ versus Wi-Fi™, etc.), or direct or indirect wireless connection, or potentially based on measurement of bandwidth and/or read range, etc.) is terminated when the wireless connection with the better bandwidth and/or read time is in place; and (e) transmitting content from the POI computing device to the mobile device.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in extending dialogue between a mobile device and a point-of-interaction computing device, the method comprising:
    receiving, by a conduit server, from a point-of-interaction (POI) computing device, via a connection between the conduit server and the POI computing device, a request for an extended connection between the POI computing device and a mobile device of a user in relation to an interaction between the user and the POI computing device, the request including an identifier and at least one encrypted action, the identifier specific to an account of the user;
    notifying, by the conduit server, a host server of the request for the extended connection between the POI computing device and the mobile device of the user, whereby the host server initiates, through a notification server, a user notification of the extended connection to the mobile device; and then
    receiving, by the conduit server, from the mobile device, via a connection between the conduit server and the mobile device, the identifier;
    in response to the identifier from the mobile device, pairing, by the conduit server, based on the identifier, the connection between the conduit server and the POI computing device and the connection between the conduit server and the mobile device, to establish a first wireless connection between the POI computing device and the mobile device, via the conduit server; and
    submitting, by the conduit server, a wake-up call to the mobile device, whereby the mobile device publishes the identifier to establish a second wireless connection directly between the POI computing device and the mobile device.

2. The computer-implemented method of claim 1, wherein the identifier includes a primary account number (PAN) associated with the account of the user.

3. The computer-implemented method of claim 2, wherein the interaction includes a payment account transaction to the account of the user; and
    wherein the POI computing device includes an electronic cash register (ECR).

4. The computer-implemented method of claim 1, wherein receiving the identifier via the connection between the conduit server and the mobile device includes receiving the identifier via a uniform resource locator (URL) specific to the conduit server.

5. The computer-implemented method of claim 1, wherein the second wireless connection includes a short-range wireless connection.

6. The computer-implement method of claim 1, further comprising:
    receiving, by the host server, from the conduit server, the notification of the request for the extended connection, the notification including the identifier and the at least one encrypted action;
    decrypting, by the host server, the at least one encrypted action; and
    requesting, by the host server, the user notification of the extended connection from the notification server, whereby the notification server identifies the mobile device and transmits the user notification to the mobile device.

7. The computer-implemented method of claim 6, wherein the user notification includes a uniform resource locator (URL) specific to the conduit server.

8. The computer-implemented method of claim 1, further comprising informing, by the conduit server, the mobile device of the first wireless connection, via a connect application included in the mobile device.

9. The computer-implemented method of claim 1, further comprising exchanging, by the conduit server, at least one message between the POI computing device and the mobile device, via the first wireless connection.

10. The computer-implemented method of claim 1, wherein submitting the wake-up call to the mobile device includes submitting the wake-up call to the mobile device via the notification server.

* * * * *